(12) United States Patent
Schumacher et al.

(10) Patent No.: US 6,345,224 B1
(45) Date of Patent: Feb. 5, 2002

(54) METHOD AND SYSTEM FOR ADVANCED NEUTRAL TOW

(75) Inventors: Darren A. Schumacher, Parkland, FL (US); Michael A. Badalament, Dearborn; Alan J. Chewter, Ypsilanti, both of MI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/532,070

(22) Filed: Mar. 21, 2000

(51) Int. Cl.⁷ .......................... F16A 3/54; B60K 17/346
(52) U.S. Cl. .......................... 701/69; 701/89; 180/233; 303/190
(58) Field of Search ............................. 701/69, 48, 70, 701/81, 89; 180/233, 243, 244; 303/190

(56) References Cited

U.S. PATENT DOCUMENTS 4,936,404 A * 6/1990 Matsumoto ................. 180/197
5,522,776 A * 6/1996 Alvey ........................... 477/35

* cited by examiner

Primary Examiner—William A. Cuchlinski, Jr.
Assistant Examiner—Arthur D. Donnelly

(57) ABSTRACT

A method of initiating a neutral tow feature in a four-wheel drive vehicle. To initiate the neutral tow feature, an input signal is received from at least one signal generating device. Thereafter, it is determined if the at least one signal indicates that a precondition has been met. If the precondition has been met, then the neutral tow feature is automatically engaged.

18 Claims, 3 Drawing Sheets

METHOD AND SYSTEM FOR ADVANCED NEUTRAL TOW

FIELD OF THE INVENTION

The invention relates to four-wheel drive systems, including but not limited to a method for performing neutral tow braking on a four-wheel-drive vehicle.

BACKGROUND

Known four-wheel-drive powertrains of a four-wheel drive vehicle have an internal combustion engine and a multiple-ratio, geared transmission. The crankshaft of the engine is connected to torque input gearing of the transmission and the output shaft of the transmission is connected to a rear drive shaft, which delivers torque to a rear differential and to rear traction wheels for the vehicle.

A transfer case provides a torque flow path to the front wheels of the four-wheel drive vehicle. The transfer case normally operates in a four-wheel, high speed mode, a four-wheel, low speed mode and a neutral mode. The neutral mode, also known as a "neutral tow" feature, allows four-wheel drive vehicles to be towed behind another vehicle, for example, a motor home, over long distances. The basic function of this feature is to shift the transfer case motor to a neutral position during towing, preventing transfer case damage during towing.

There are disadvantages with. known neutral tow methods. For example, one disadvantage occurs when the neutral tow feature is activated and the vehicle is unhooked on an inclined surface. When this occurs, the vehicle could roll away uncontrolled to possibly cause personal injury or property damage. Another disadvantage occurs in that the transfer case could be destroyed if the transfer case is engaged when the four-wheel drive vehicle is being towed, even if the vehicle's transmission is in neutral.

Accordingly, there is a need for an improved neutral tow method that reduces the risk of injury to persons and property, and, overall, is more reliable.

BRIEF DESCRIPTION OF THE DRAWINGS

Other features and advantages of the invention will be apparent to those skilled in the art with reference to the detailed description and the drawings, of which.

DETAILED DESCRIPTION OF THE PRESENTLY PREFERRED EMBODIMENTS

Figure 1:
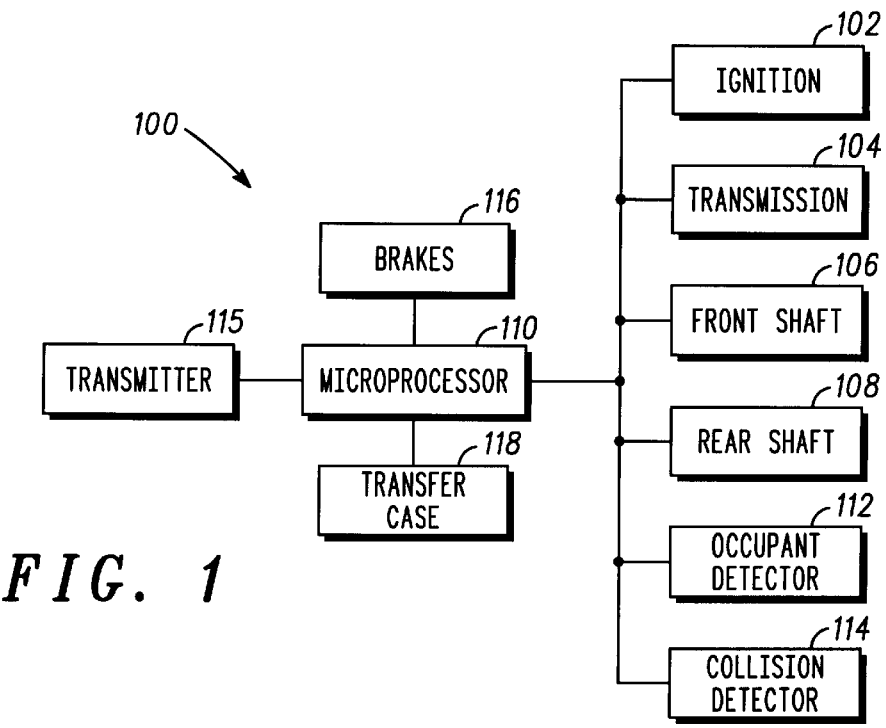
FIG. 1 is a block diagram representation of a four-wheel drive system in accordance with the preferred embodiments.

Referring to the drawings, and particularly FIG. 1, shown is an exemplary system for a four-wheel drive vehicle, generally 100, which monitors signals from at least one signal monitoring device (not shown). The signal generating devices generate signals relating to the state of any one or more of an ignition 102, a transmission 104, a front shaft 106 speed and a rear shaft 108 speed. The signals are monitored, for example, with a microprocessor 110. The system 100 could also include an adult occupant detector 112, a collision detector 114 and a transmitter 115, which connect with the microprocessor 110. The microprocessor 110 also connects with the four-wheel drive vehicle's brakes 116 and transfer case 118, either directly or indirectly.

Figure 2:
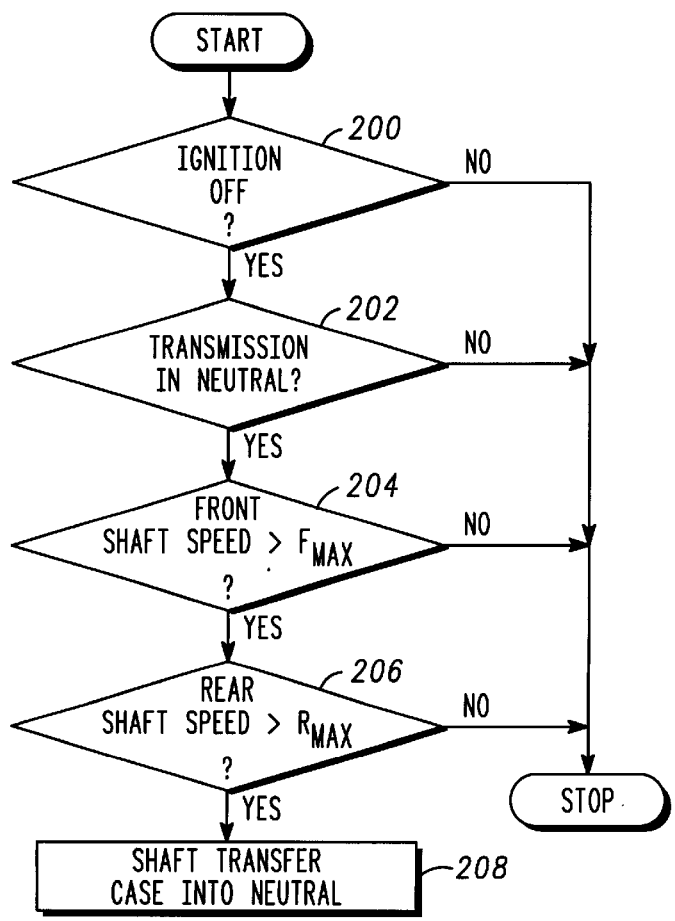
FIG. 2 is a flowchart representation of an advanced neutral tow system in accordance with the preferred embodiments.

Referring also to FIG. 2, a flow chart is shown for performing advanced neutral tow according to a first aspect of the preferred embodiments. Accordingly, to accomplish advanced neutral tow, two or more inputs are added to the vehicle, for example, to measure front and rear shaft 108 speeds. In addition, a signal indicating the state of the vehicle's ignition 102 is checked and a transmission signal is monitored to determine the present gear of the transmission 104.

Incoming signals, such as the four identified above, are monitored to determine whether the vehicle is being towed. The signals can be monitored, for example, by a microprocessor 110. In a preferred embodiment, the vehicle is being towed when any three of the above identified four signals indicate a tow condition. Thus, it is determined whether the ignition 102 is off, at Step 200. It is also determined whether the transmission 104 is in neutral, at Step 202. In addition, it is determined whether the front shaft 106 speed is greater than a maximum front shaft speed (Fmax), at Step 204. It is also determined whether the rear shaft 108 speed is greater than a maximum rear shaft speed (Rmax), at Step 206. Exemplary values for Fmax and Rmax are 5 kilometers per hour (kph), of course other values are possible. Preferably, the maximum speed values should be chosen at a speed that avoids damage to the transfer case 118. Thereafter, if at least three of the four signals indicate that vehicle is being towed, the transfer case 118 automatically shifts into neutral, at Step 208.

Figure 3:
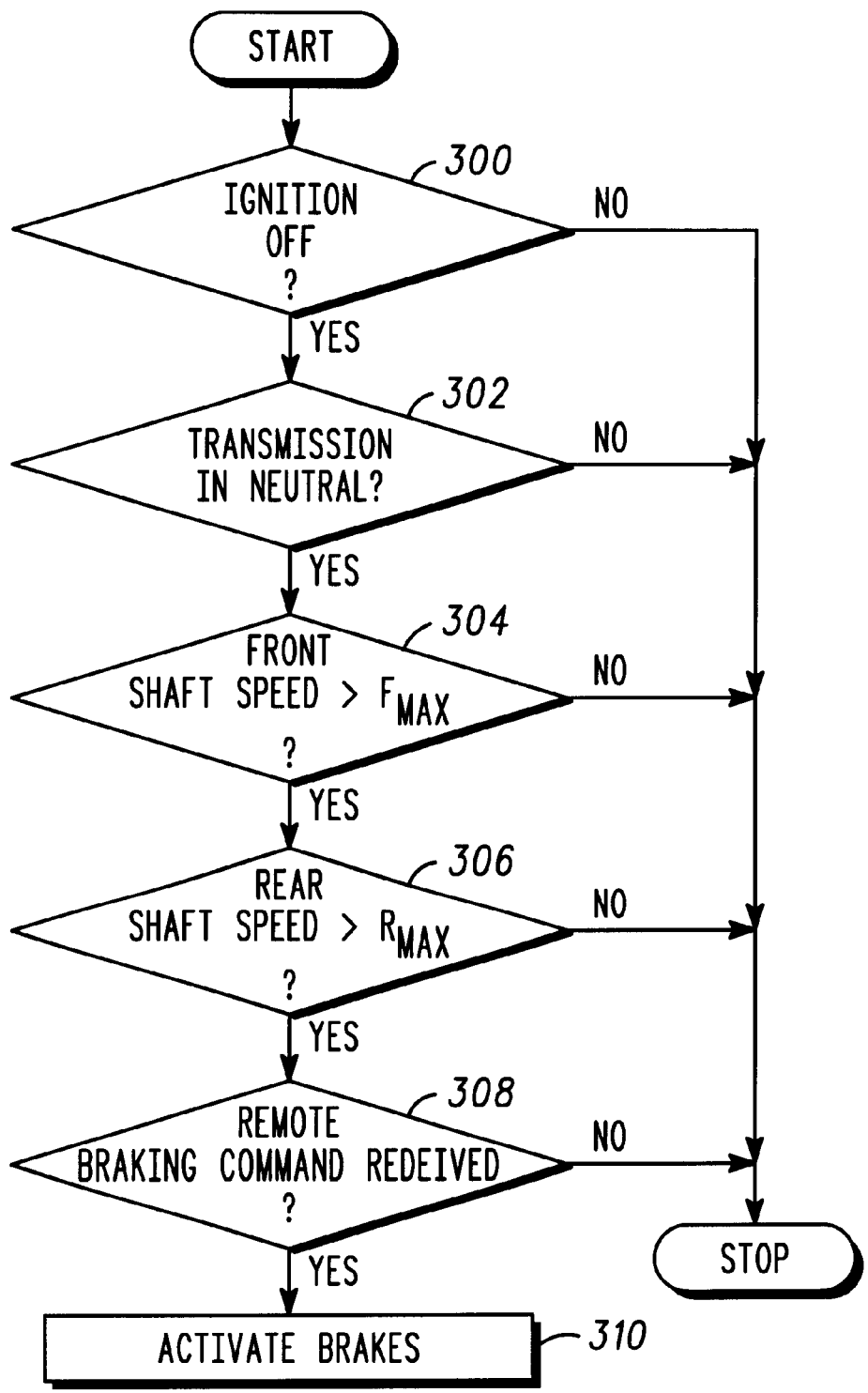
FIG. 3 is a flowchart representation of an advanced neutral tow system using a remote brake activation device in accordance with the preferred embodiments.

Referring to FIG. 3, according to a second aspect of the preferred embodiments, the transmitter 115 is added to the system that an operator uses to remotely activate brakes 116 of the vehicle, for example, from a key chain. Those skilled in the art will appreciate that the transmitter 115, when activated, automatically applies the brakes 116 of the vehicle. Thus, to prevent runaway vehicles, several signals are monitored and the vehicle's brakes 116 are applied when the following conditions are met. Of course, the following conditions are for exemplary purposes, and artisans will appreciate that other combinations of conditions could be met to activate the brakes 116.

In a preferred embodiment, it is determined whether the ignition 102 is off, at Step 300. It is also determined whether the transmission 104 is in neutral, at Step 302. In addition, it is determined whether the front shaft 106 speed is greater than Fmax, at Step 304. It is also determined whether the rear shaft 108 speed is greater than Rmax, at Step 306. If, all of these conditions are met, and an operator depresses the transmitter 115, at Step 308, then the vehicle's brakes 116 are activated, at Step 310. Thus, operators are allowed to stop runaway vehicles almost instantly, which could greatly reduce property damage and potential liability.

Figure 4:
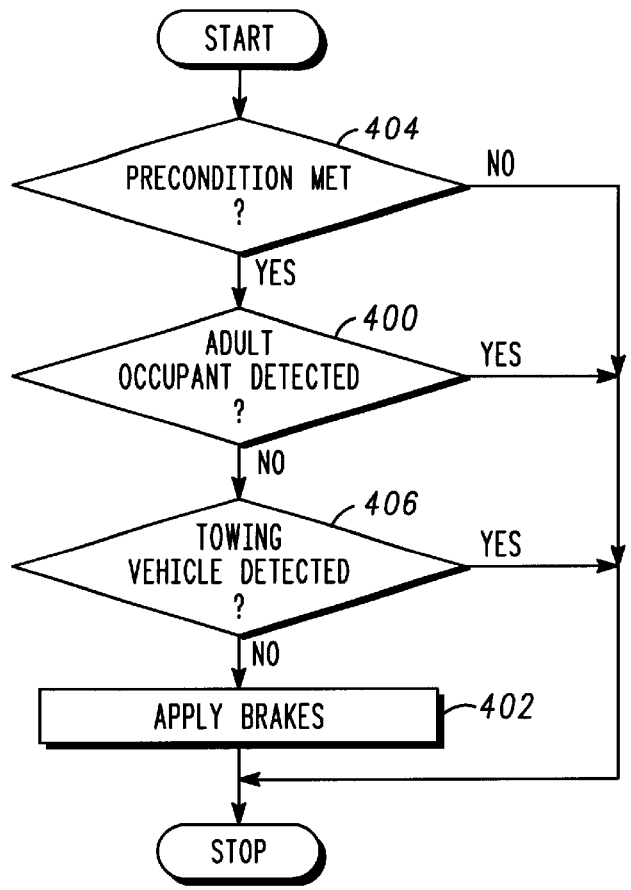
FIG. 4 is a flowchart representation of an automatic brake activation system in accordance with the preferred embodiments.

Referring to FIG. 4, in a third aspect of the preferred embodiments, the vehicle possesses an occupant detection system and a collision avoidance system. If no adult occupant is detected, at Step 400 and the vehicle is moving, as determined, for example, from the Fmax and Rmax signals described above, then the vehicle's brakes 116 are automatically applied, at Step 402. In addition, if the preconditions for towing the vehicle are met, at Step 404, and the collision avoidance system does not detect a towing vehicle, at Step 406, then the vehicle's brakes 116 are automatically applied, at Step 402. The preconditions for towing are met when, for example, the ignition 102 is off, the transmission 104 is in neutral and at least one of Fmax and Rmax are met. Of course, other conditions could be required such as the condition that the occupant detection system does not detect an adult in the vehicle, at Step 400.

Figure 5:
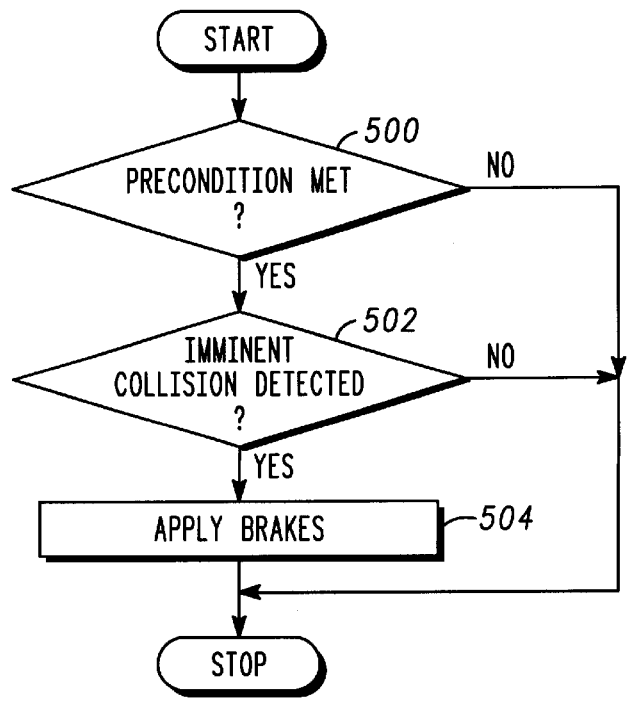
FIG. 5 is a flowchart representation of an automatic brake activation system of an advanced neutral tow system in accordance with the preferred embodiments.

Referring to FIG. 5, according to a fourth aspect of the present embodiments, if preconditions are met, at Step 500, and the collision avoidance system detects an imminent collision, at Step 502, then the vehicle's brakes 116 are automatically applied, at Step 504. In a preferred embodiment, precondition are met, at Step 500, when the ignition 102 is off, and the vehicle is moving, for example, as shown by signals Fmax and Rmax. Of course, systems other than a collision avoidance system could be used, such as a sonar or radar, to detect an imminent collision.

It should be appreciated that any combination of the above aspects of the preferred embodiments could also be utilized. It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A method of automatically activating brakes of a four wheel drive vehicle, comprising the steps of:
    monitoring an input signal from at least one signal generating device, wherein the at least one signal generating device relates to the state of any one or more of an ignition, a transmission, a front shaft speed, and a rear shaft speed;
    determining if the at least one monitored input signal indicates a precondition has been met, wherein the precondition is met if the ignition is off, the transmission is in neutral, and the front shaft speed is greater than a maximum allowed front shaft speed or the rear shaft speed is greater than a maximum allowed rear shaft speed; and
    automatically activating the brakes of the four-wheel drive vehicle if the precondition has been met and an operator initiates a remote braking command.

2. The method of claim 1, wherein the at least one signal generating device further includes at least one of an adult occupant detector and a collision detector.

3. The method of claim 2, wherein the brakes are activated if the preconditions are met and the adult occupant detector does not detect an occupant.

4. The method of claim 2, wherein the brakes are activated if the preconditions are met, the adult occupant detector does not detect an occupant and the collision detector does not detect a vehicle.

5. The method of claim 2, wherein the collision detector includes a radar.

6. The method of claim 2, wherein the collision detector includes a sonar.

7. The method of claim 1, wherein the input signals are monitored with a microprocessor.

8. The method of claim 1, wherein the remote braking command is initiated with a transmitter.

9. A method of automatically activating brakes of a four-wheel drive vehicle, comprising the steps of:
    monitoring an input signal from at least one signal generating device;
    determining if the at least one monitored input signal indicates a precondition has been met; and
    automatically activating the brakes of the four-wheel drive vehicle if the precondition has been met and an collision detection system detects an imminent collision.

10. The method of claim 9, wherein the at least one signal generating device relates to the state of any one or more of an ignition, a transmission, a front shaft speed and a rear shaft speed.

11. The method of claim 10, wherein the precondition is met if the ignition is off, the transmission is in neutral, the front shaft speed is greater than a maximum allowed front shaft speed and the rear shaft speed is greater than a maximum allowed rear shaft speed.

12. A method of automatically activating brakes of a four wheel drive vehicle, comprising the steps of:
    monitoring an input signal from at least one of an adult occupant detector and a collision detector;
    determining if the at least one monitored input signal indicates a precondition has been met; and
    automatically activating the brakes of the four-wheel drive vehicle if the precondition has been met and an operator initiates a remote braking command.

13. The method of claim 12, wherein the first precondition is met when the adult occupant detector does not detect an occupant.

14. The method of claim 12, wherein the first precondition is met when the collision detector does not detect a vehicle.

15. A method of automatically activating brakes of a four wheel drive vehicle comprising the steps of:
    monitoring a first input signal from at least one of an adult occupant detector and a collision detector and a second input signal from a signal generating device relating to a state of any one or more of an ignition, a transmission, a front shaft speed, and a rear shaft speed;
    determining if the first input signal indicates a first precondition has been met and the second input signal indicates a second precondition has been met; and
    automatically activating the brakes of the four-wheel drive vehicle if each of the first precondition and the second precondition have been met.

16. The method of claim 15, wherein the first precondition is met when the adult occupant detector does not detect an occupant.

17. The method of claim 15, wherein the first precondition is met when the collision detector does not detect a vehicle.

18. The method of claim 15, wherein the second precondition is met if the ignition is off, the transmission is in neutral, the front shaft speed is greater than a maximum allowed front shaft speed, or the rear shaft speed is greater than a maximum allowed rear shaft speed.

* * * * *